(12) United States Patent
Lewis et al.

(10) Patent No.: US 10,568,255 B2
(45 subsequent application of the condensate to a plant growing medium with irrigation water.

18 Claims, 10 Drawing Sheets

(51) Int. Cl.
| | |
|---|---|
| *B01D 53/92* | (2006.01) |
| *B01D 47/02* | (2006.01) |
| *A01C 7/20* | (2006.01) |
| *A01C 23/04* | (2006.01) |
| *F02M 26/15* | (2016.01) |
| *A01C 7/06* | (2006.01) |
| *F01N 3/04* | (2006.01) |
| *F01N 3/28* | (2006.01) |
| *F01N 9/00* | (2006.01) |
| *A01C 7/08* | (2006.01) |

(52) U.S. Cl.
CPC ........... *B01D 47/02* (2013.01); *B01D 47/021* (2013.01); *B01D 53/92* (2013.01); *F01N 3/0205* (2013.01); *F01N 3/04* (2013.01); *F01N 3/2896* (2013.01); *F01N 9/00* (2013.01); *F02M 26/15* (2016.02); *A01C 7/081* (2013.01); *B01D 2251/504* (2013.01); *B01D 2259/124* (2013.01); *F01N 2900/1404* (2013.01)

(56) References Cited

U.S. PATENT DOCUMENTS

| | | | |
|---|---|---|---|
| 2005/0178111 A1* | 8/2005 | Kammel | B01D 53/9409 60/289 |
| 2015/0007496 A1* | 1/2015 | Lewis | A01G 7/02 47/58.1 R |

FOREIGN PATENT DOCUMENTS

| | | |
|---|---|---|
| WO | 2013/110202 A1 | 8/2013 |
| WO | 2013110202 | 8/2013 |

* cited by examiner

EMISSIONS RECYCLING USING SOLUBILIZER EQUIPMENT

FIELD OF THE INVENTION

The present invention relates to recycling equipment that solubilizes emissions into water whereby internal combustion emissions during combustion which produce ultra-fine to nano-meter size particulate matter are solubilized in water for subsequent delivery to plant growing medium. More particularly the equipment relates to the production of water soluble carbon nanotubes.

BACKGROUND

Internal combustion emissions, particularly diesel, can produce large amounts of diesel particulate matter (soot) that cause smog and poor air quality. Agriculture has the potential to use and sequester emissions as plant nutrients and soil amendments that would otherwise be air pollution. Resent diesel engine design tier 5 emissions controls have lowered the particulate matter and $NO_x$ by adding Urea or fertilizer to the exhaust. Solubilizing emissions into water and recycling emissions back to make fertilizer, instead of adding more fertilizer to exhaust wasting energy.

SUMMARY OF THE INVENTION

According to one aspect of the present invention there is provided emissions solubilizing equipment for recycling emissions into plant nutrients and soil amendments improving plant growth characteristics for a plant growing medium, the equipment comprising:

providing an internal combustion engine arranged to combust a fuel therein;

operating the internal combustion engine to combust the fuel mixture in pyrolysis to produce exhaust emissions; and arranging emissions recycling equipment to take advantage of the heat of combustion to produce chemistry that aide in the solubilisation of the emissions.

According to another aspect of the invention there is provided an exhaust recycling system comprising:

an internal combustion engine including engine controls for operating the engine so as to produce exhaust emissions containing carbon nano soot therein;

a solubilizing tank containing an operating level of water including nitric acid in solution in the water;

an exhaust duct for connection between the engine and the solubilizing tank, for communicating the exhaust emissions containing carbon nano soot from the engine to the solubilizing tank;

an injection array supported in the tank below the operating level of the water, the injection array being in communication with the exhaust duct so as to be arranged to inject the exhaust emissions into the water within the solubilizing tank so as to solubilize the carbon nano soot as carbon nano tubes within the water in the solubilizing tank; and a gas outlet on the solubilizing tank for receiving a gas flow exiting the tank such that some water and some solubilized carbon nano tubes are carried with the gas flow for subsequent delivery to a plant growing medium.

Preferably the engine controls are arranged to operate the engine in pyrolysis to produce the carbon nano soot.

According to other important independent aspects of the invention, i) the water in the solubilizing tank may contain the nitric acid at saturation level therein, ii) the water in the solubilizing tank may contain carbonic acid at saturation level therein, iii) the water in the solubilizing tank may contain fulvic acid therein, iv) the water in the solubilizing tank may contain aromatic compounds therein, or v) the water may contain any combination of the above compounds therein.

Preferably the water in the solubilizing further includes carbonic acid in solution therein.

In the present invention, operating the engine in pyrolysis can assist in producing multi-wall carbon nanotubes. The multi wall carbon nanotubes (MWCT) can be processed in the method with nitric acid to become soluble in water. The condensation of the emissions that contain nitric acid, carbonic acid and aromatic compounds replenish water levels in the solubilizing tank and will aid in solubilizing the soot and Nano carbon tubes into water allowing the system to work with sprayers, irrigation water, treatment ponds and waste management, methane production, composters, air Seeders and alga growth for bio fuel production. Solubilized carbon nanotubes stay suspended in solution to facilitate root up take.

The carbon nanotube seeding material may comprise a mineral, a magnetic metal, a transitional metal, an alloy, or other related compounds alone or in combination.

Preferably a conditioning system is arranged to receive and condition the exhaust emissions therein to produce carbon nanotubes.

Preferably low oxygen levels are maintained in the exhaust emissions so as to minimize oxidisation in the conditioning system and so as to minimize production of $NO_2$ in the conditioning system.

Preferably a heat exchanger is provided in series with the exhaust duct for cooling the exhaust emissions prior to injecting the exhaust emissions into the solubilizing tank. A controller may operate the heat exchanger to vary a rate of cooling responsive to a sensed temperature of the exhaust emissions.

Preferably a cooling circuit communicates in a closed loop between the solubilizing tank and a cooling device for cooling the water in the solubilizing tank. A controller may operate the cooling circuit to vary a rate of cooling responsive to a sensed temperature of the water.

The solubilizing tank may include an exhaust inlet pipe on the solubilizing tank for communicating exhaust emissions from the exhaust duct into the solubilizing tank and a spray nozzle in the exhaust inlet pipe which communicates with the solubilizing tank for spraying water from the solubilizing tank into a flow of exhaust emissions entering the solubilizing tank through the exhaust inlet pipe.

In some embodiments, a branch duct may communicate between the exhaust duct and a combustion air intake of the engine such that a primary flow of the exhaust emissions is directed by the exhaust duct into the solubilizing tank and a secondary flow of the exhaust emissions is directed by the branch duct into the combustion air intake.

In some embodiments, an auxiliary water tank and a water control system may be provided which are arranged to transfer water between the auxiliary water tank and the solubilizing tank to maintain the water in the solubilizing tank at the operating level, for either removing excess water above an upper limit of the solubilizing tank, adding water below a lower limit of the solubilizing tank, or both.

The injection array may comprise a manifold structure supported in the solubilizing tank below the operating water level in which the manifold structure has a horizontally extending upper duct portion for communicating exhaust emissions therethrough along a bottom end of the solubilizing tank and a plurality of injection openings at horizontally spaced apart positions along the manifold structure below the upper duct portion for dispersing exhaust emissions into the solubilizing tank.

The solubilizing tank may further include a partition member separating the tank into an injection portion receiving the injection array therein and a settling portion separate from the injection portion which communicates with the gas outlet, the partition member including at least one opening therein for communicating water and exhaust emissions from the injection portion to the settling portion.

In one embodiment, the system is used with an agricultural seeding implement having a distribution fan for pneumatically conveying seed through seed tubes for delivery into furrows in a ground surface in which the distribution fan has an inlet in communication with the gas outlet on the solubilizing tank for directing said gas flow into the seed tubes. In this instance, a water separator, for example a baffle arrangement or a water trap, may be provided in series with the gas outlet for removing liquid water from said gas flow prior to delivery to the distribution fan.

In an alternative embodiment, the engine comprises a primary engine of a tractor and the system further comprises an agricultural seeding implement towed by the tractor in which the agricultural implement comprises: i) a plurality of furrowing elements for forming furrows in the ground; ii) a plurality of seed distribution tubes for delivering seed to the furrowing elements respectively; iii) a seed metering system for metering seed into the seed distribution tubes respectively; and iv) a supply duct communicating between the gas outlet on the solubilizing tank and the seed distribution tubes such that a gas pressure for conveying seed through the seed distribution tubes to the furrowing elements is derived solely from exhaust pressure from the internal combustion engine which is communicated through the solubilizing tank. In this instance, a pressure relief valve is preferably in communication with the gas outlet on the solubilizing tank for venting the gas flow externally responsive to pressure of the gas flow exceeding an upper limit of the pressure relief valve.

In an embodiment, the system is used with an agricultural spraying implement for being driven across a crop covered ground by said internal combustion engine in which the agricultural spraying implement includes i) a boom supporting a plurality of spaced apart dispensing nozzles thereon and ii) a supply duct communicating between the gas outlet of the solubilizing tank and the dispensing nozzles for dispensing said gas flow carrying the water and the solubilized carbon nano tubes onto said crop covered ground through the dispensing nozzles. The spraying implement in this instance preferably further comprises i) a liquid tank supported on the implement and ii) a plurality of liquid nozzles spaced apart on the boom for delivery of liquid from the liquid tank onto the crop covered ground through the liquid nozzles independently of the gas flow dispensed through the dispensing nozzles.

In one configuration of the agricultural spraying implement, the gas outlet is connected to the dispensing nozzles such that said gas flow carrying the water and the solubilized carbon nano tubes is dispensed such that a gas pressure for dispensing said gas flow from the dispensing nozzles is derived solely from exhaust pressure from the internal combustion engine which is communicated through the solubilizing tank. In this instance, a pressure relief valve is preferably in communication with the gas outlet on the solubilizing tank for venting the gas flow externally responsive to pressure of the gas flow exceeding an upper limit of the pressure relief valve.

Alternatively, the agricultural spraying implement may be operated with a distribution fan in communication between the gas outlet of the solubilizing tank and the dispensing nozzles.

According to a further embodiment of the present invention, the engine of the system may comprise a primary engine of a passenger vehicle, for example a pick-up truck. In this instance the system may further include an auxiliary tank containing an operating level of water therein and an auxiliary injection array supported in the auxiliary tank below the operating level of the auxiliary tank in which the auxiliary injection array is in communication with the gas outlet of the solubilizing tank so as to be arranged to disperse the gas flow from the gas outlet into the water with the auxiliary tank.

According to another embodiment of the present invention, the engine of the system comprises a pump engine of an irrigation pump in an irrigation system in which the gas outlet of the solubilizing tank communicates with irrigation water of the irrigation system for delivery to the plant growing medium together with the irrigation water.

The gas outlet preferably communicates with the irrigation water by providing an auxiliary tank containing an operating level of water therein and an auxiliary injection array supported in the auxiliary tank below the operating level of the auxiliary tank in which the auxiliary injection array is in communication with the gas outlet of the solubilizing tank so as to be arranged to disperse the gas flow from the gas outlet into the water with the auxiliary tank. The secondary tank may then have a water outlet in communication with the irrigation water so as to deliver the water from the auxiliary tank to the plant growing medium together with the irrigation water.

The irrigation system may further include a cooling circuit communicating between the irrigation water and the exhaust duct for cooling the exhaust emissions prior to injection into the water in the solubilizing tank, and a similar cooling circuit communicating between the irrigation water and the solubilizing tank for cooling the water in the solubilizing tank.

According to another aspect of the present invention there is provided a method of recycling exhaust emissions comprising:

providing an internal combustion engine and operating the engine so as to produce exhaust emissions containing carbon nano soot therein;

providing a solubilizing tank containing an operating level of water including nitric acid in solution in the water;

injecting the exhaust emissions containing carbon nano soot from the engine into the water within the solubilizing tank so as to solubilize the carbon nano soot as carbon nano tubes within the water in the solubilizing tank; and capturing a gas flow exiting the tank such that some water and some solubilized carbon nano tubes are carried with the gas flow for subsequent delivery to a plant growing medium.

Preferably the engine is operated in pyrolysis to produce the carbon nano soot.

Preferably the exhaust emissions are cooled prior to injecting the exhaust emissions into the solubilizing tank responsive to a sensed temperature of the exhaust emissions.

Cooling fluid may be circulated in a closed loop cooling circuit between the solubilizing tank and a cooling device for cooling the water in the solubilizing tank responsive to a sensed temperature of the water.

The method may also include spraying water from the solubilizing tank into a flow of exhaust emissions entering the solubilizing tank.

In some instance, a primary flow of the exhaust emissions from the engine may be directed into the solubilizing tank while a secondary flow of the exhaust emissions from the engine may be recycled back into the combustion air intake.

According to a further aspect of the present invention there is provided a method of recycling exhaust emissions comprising:

providing an internal combustion engine for combusting a fuel to produce exhaust emissions;

directing a primary flow of the exhaust emissions from the internal combustion engine for application to a plant growing medium; and directing a secondary flow of the exhaust emissions from the internal combustion engine for introduction into a combustion air intake of the internal combustion engine.

Water may be injected to produce steam in the secondary flow.

Preferably the primary flow is greater than the secondary flow.

The system may further include i) a main exhaust duct for exhausting emissions from the engine; ii) a primary branch duct receiving the primary flow from the main exhaust duct; and iii) a secondary branch duct receiving the secondary flow from the main exhaust duct at a junction with the primary branch duct such that the secondary branch duct is in heat exchanging relationship with the main exhaust duct.

The secondary branch duct may be in a counter-flow heat exchanging relationship along a full length of the main exhaust duct between said junction and the engine.

The method may include cooling the primary flow of exhaust emissions in a heat exchanger subsequent to separation of the secondary flow of exhaust emissions from the primary flow of exhaust emissions.

The method may also include providing a sacrificial oxidizible metallic element within the secondary flow of exhaust emissions.

According to another important independent aspect of the present invention, there is provided an agricultural seeding implement for use with a tractor having an internal combustion engine, the implement comprising:

a plurality of furrowing elements for forming furrows in the ground;

a plurality of seed distribution tubes for delivering seed to the furrowing elements respectively;

a seed metering system for metering seed into the seed distribution tubes respectively; and a supply duct for communicating exhaust emissions from the internal combustion engine to the seed distribution tubes such that a gas pressure for conveying seed through the seed distribution tubes to the furrowing elements is derived solely from exhaust pressure from the internal combustion engine which is communicated through the supply duct.

The seed metering system may further comprise at least one venturi tube receiving a flow of the exhaust emissions therethrough to accelerate the flow for carrying the seed in the accelerated flow.

The system may further comprise a pressure relief valve in communication with the gas outlet on the solubilizing tank for venting the gas flow externally responsive to pressure of the gas flow exceeding an upper limit of the pressure relief valve.

BRIEF DESCRIPTION OF THE DRAWINGS

Various embodiments of the invention will now be described in conjunction with the accompanying drawings in which:

FIG. 1 is a schematic view of an exhaust emission recycling system including a solubilizing tank for solubilizing exhaust emissions from an engine for subsequent use in improving plant growth characteristics of a plant growing medium;

FIG. 2 is a schematic view of a heat exchanger of the system of FIG. 1;

FIG. 3 is a perspective view of the solubilizing tank;

FIG. 4 is a perspective view of the manifold structure forming the exhaust injection array at the bottom of the tank;

FIG. 5 is a top plan view of the tank;

FIG. 6 is a sectional view along the lines 6-6 of FIG. 5;

FIG. 7 is a sectional view along the line 7-7 of FIG. 5;

FIG. 8 is a sectional view along the line 8-8 of FIG. 5;

FIG. 9 is a schematic view of the system of FIG. 1 shown applied to a first embodiment of an agricultural seeding implement;

FIG. 10 is a schematic view of the system of FIG. 1 shown applied to a second embodiment of an agricultural seeding implement;

FIG. 11 is a schematic view of the system of FIG. 1 shown applied to an agricultural spraying implement;

FIG. 12 is a schematic view of the system of FIG. 1 shown applied to a passenger vehicle for storing nutrients to be subsequently applied to a plant growing medium;

FIG. 13 is a schematic view of the system of FIG. 1 shown applied to an irrigation system; and FIG. 14 is a schematic view of the system of FIG. 1 shown applied to a lawn mower implement.

In the drawings like characters of reference indicate corresponding parts in the different figures.

DETAILED DESCRIPTION

Referring to the accompanying drawings, there is illustrated an exhaust emissions recycling and irrigation system including emissions reduction solubilizer equipment, generally indicated by reference numeral 10. The recycling system is suited for producing solubilised carbon and fulvic acid for improving plant growth characteristics of a plant growing medium, for example agricultural soil.

According to one aspect, the invention may include adding a carbon nanotube seeding material to the fuel of an international combustion engine to produce a fuel mixture which is combusted by the engine in pyrolysis to produce black carbon ultrafine and nano soot in the exhaust emissions which are captured for conditioning such that the nano carbon soot is processed into carbon nanotubes for subsequent delivery to the plant growing medium. The exhaust emissions are passed through a solution of water which condenses exhaust emissions and solubilizes compounds in the emissions such that the solution of water reaches a concentration level which contains carbonic and nitric acid which is at or near respective saturation levels. The water also contains fulvic acid and various aromatic compounds therein. The solution of water saturated with nitric acid, carbonic acid, fulvic acid and aromatic compounds is then capable of solubilising the carbon nano soot into carbon nano tubes from further emissions passed through the solution of water. The solubilised carbon nano tubes are carried out of the water solution with an exiting gas flow that carries some water with it. The water carried away from the solution with the exiting gas flow is proportional to the condensed water vapor from new exhaust emissions condensed into the solution for maintaining an operating level of solution.

Although various embodiments of the invention are shown in the accompanying figures, the common features of the system according to generic FIGS. 1 through 8 will first be described.

The system 10 generally includes an internal combustion engine 18 having a combustion air intake 20 to receive combustion air for mixture with fuel within the engine where combustion takes place to produce exhaust at an exhaust outlet 22 of the motor. The exhaust outlet may be an exhaust manifold of the motor, or in the instance of a motor including a turbo, the outlet of the turbo.

The system 10 further includes a solubilizing tank 24 which contains an operating level of water therein. The water in the tank includes nitric acid and carbonic acid therein. The exhaust of the motor is directed into the solubilizing tank 24 where the exhaust emissions are bubbled through the water in the tank to solubilize carbon soot in the form of carbon nano tubes within the water as further described below.

The exhaust emissions are directed from the outlet 22 of the motor through a main duct 28 up to a vertical inlet pipe 30 which forms the inlet of the solubilizing tank. The bottom end of the inlet pipe is located within the tank 24 in proximity to the bottom end thereof.

The vertical inlet pipe 30 defines a primary duct receiving the majority of the exhaust emissions from the main duct therein. A secondary duct 32 is also provided which communicates from the junction of the primary duct 30 to the end of the main duct 28. The secondary duct 32 is much smaller in cross section than the primary duct to receive a smaller secondary flow of exhaust emissions therein. The secondary duct 32 is concentrically received within the main duct to extend in a counter-flow heat-exchanging arrangement with the main duct from the junction of the main duct to the primary and secondary ducts back to the opposing end of the main duct in proximity to the outlet 22 from the motor. The secondary duct and the main duct are thus in a heat exchanging relationship along substantially the full length of the main duct between the motor and the junction with the primary and secondary ducts.

Figure 1:
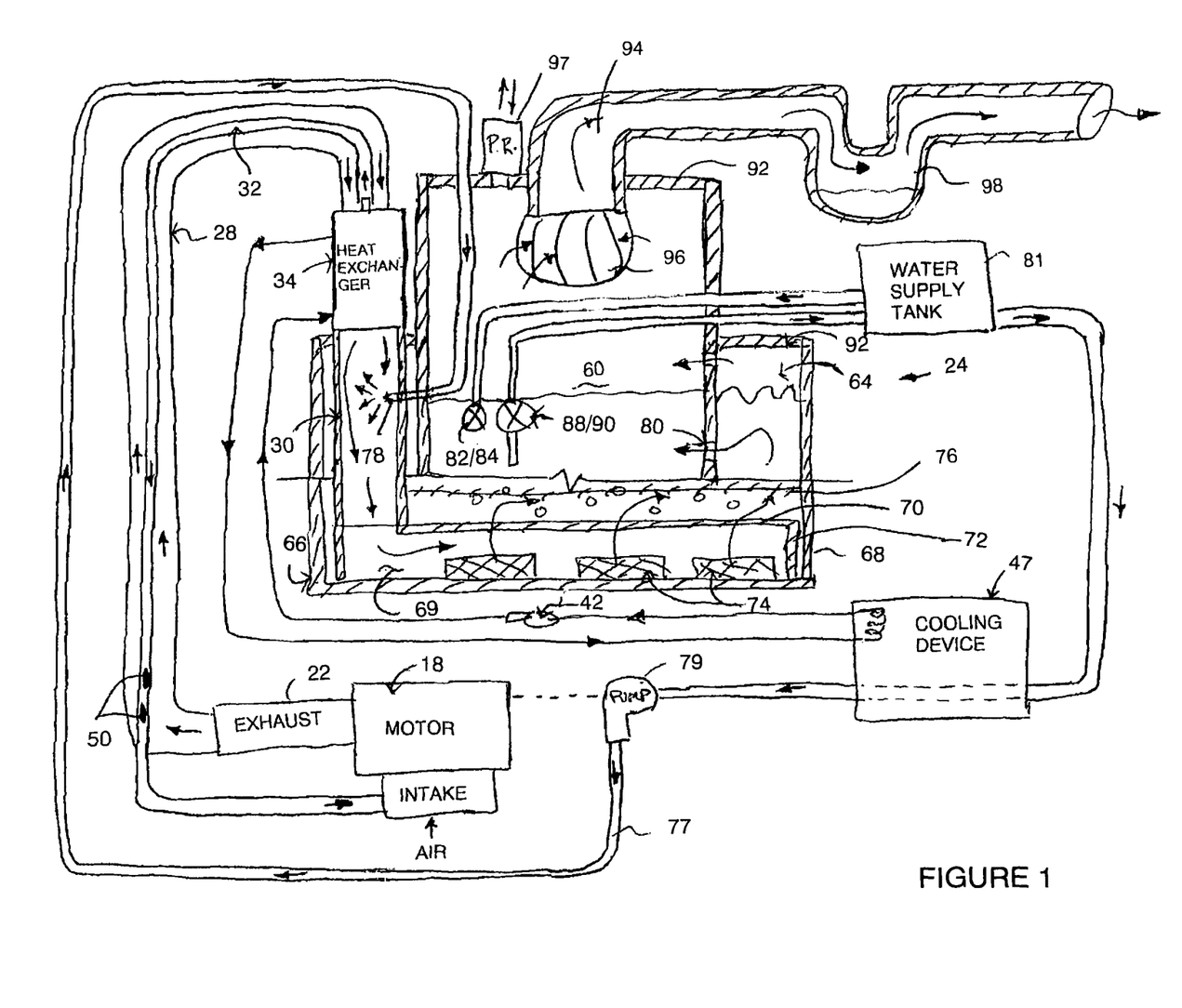
Figure 2:
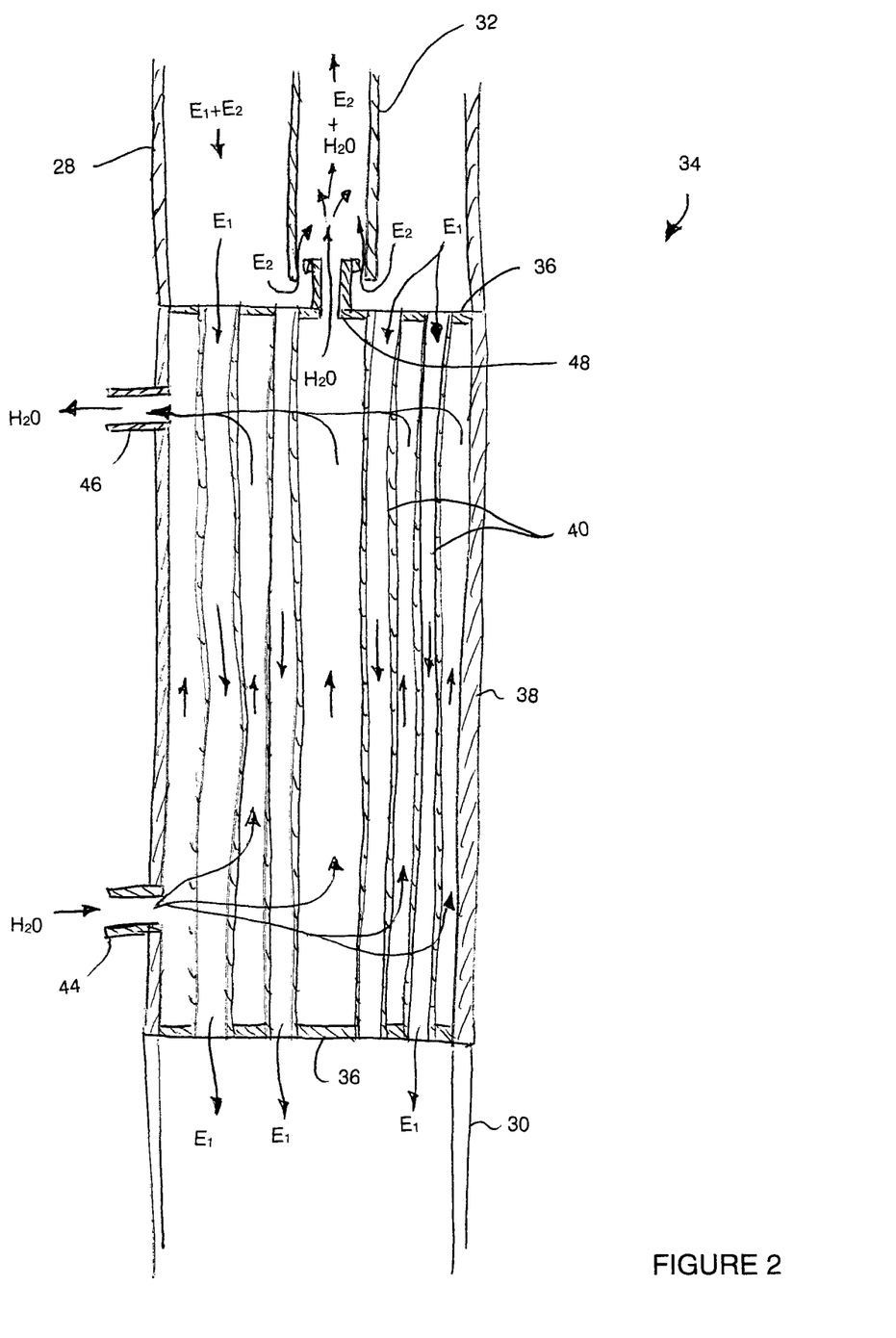

The primary duct 30 further includes a heat exchanger 34 connected in series therewith as illustrated in further detail in FIG. 2.

The heat exchanger 34 generally comprises an elongate coolant chamber having two longitudinally opposed end walls 36 and a cylindrical side wall 38 connected between the two end walls to define a tank structure receiving a coolant fluid therein. A plurality of exhaust pipes 40 communicate between the two end walls in parallel and spaced apart relationship such that the exhaust pipes 40 collectively define a portion of the primary duct communicating in series between the main duct 28 thereabove and the remainder of the primary duct in the form of a vertical inlet pipe 30 extending therebelow. Water is circulated as a coolant fluid through the coolant chamber using a respective pump for pumping water into an inlet 44 of the coolant chamber for subsequent discharge through the outlet 46 of the coolant chamber. In typical embodiments, the fluid is circulated in a closed loop cooling circuit by a pump 42 between the heat exchanger 34 and a cooling device 47.

The cooling device 47 may be a heat exchanger which uses an auxiliary source of water for cooling such as irrigation water. Alternatively, the cooling device 47 may be a radiator having fins which are air cooled for cooling the circulated cooling water. In yet a further arrangement, the cooling device may be a refrigeration device.

The heat exchanger 34 further include an orifice 48 formed in the uppermost end wall 36 for communicating a small portion of water from the coolant chamber into the inlet end of the secondary duct 32 which is located within the main duct 28 in proximity to the junction of the main duct to the heat exchanger and vertical pipe forming the primary duct therebelow.

In this manner the suction of the engine at the air intake connected to the outlet end of the secondary duct 32 draws suction through the secondary duct such that the inlet end of the secondary duct receives a small portion of exhaust emissions from the surrounding main duct together with the small amount of sprayed coolant water within the heat exchanger 34 as received through the orifice. The water injected with the secondary flow of exhaust into the secondary duct 32 is maintained at a high heat through the heat exchanging relationship with the main duct of the exhaust emissions to produce steam.

A sacrificial oxidizable metallic member 50 may be inserted into the secondary duct for chemical reaction with the steam and hot exhaust gasses recycled through the secondary duct prior to the emissions being recycled back into the intake of the motor. In this manner, the resultant gasses fed into the intake motor serve to acidify the exhaust emissions with nitric acid.

Turning now more particularly to the tank 24, the tank includes a central settling chamber 60 surrounded by partition walls 62 on all sides to define a surrounding peripheral injection chamber 64. The peripheral chamber is bound by outer tank walls of the tank. The peripheral injection chamber 64 is a rectangular, annular shape about the square center chamber 60. In some embodiments, the partition walls 62 are much greater in height than the surrounding outer tank walls such that the settling chamber 60 is much greater in height than the peripheral injection chamber 64.

The vertical inlet pipe 30 is received within the peripheral chamber 64 at a first end 66 of the tank. The bottom end of the vertical inlet pipe is connected to an injection array in the form of a manifold pipe 69 having a generally U-shaped arrangement extending along the first end of the peripheral chamber and along two opposing sides of the peripheral chamber which extends towards the opposing second end 68. The manifold pipe 69 has a top panel which is horizontal along the full U-shaped length of the manifold pipe, together with side panels 72 depending downwardly from opposing side edges of the top panel along the full length thereof.

A plurality of discharge openings 74 are provided at spaced apart positions along each of the side panels along the two side legs of the manifold pipe along opposing sides of the tank between the first and second ends thereof. Each discharge opening 74 is spaced below the top panel 70 such that an upper portion of the manifold pipe serves to trap a portion of exhaust gasses therein for communicating exhaust gasses along the length of the manifold pipe for even distribution throughout the perimeter of the peripheral chamber 64.

Each discharge opening 74 is covered by a screen member to encourage dispersion of the exhaust gasses into smaller bubbles and pockets within the surrounding irrigation water. An operating water level in the tank is maintained nearer to the top end of the peripheral injection portion of the tank than the bottom such that the manifold pipe is submerged well below the operating level.

An additional screen 76 spans horizontally across the full width and length of each portion of the peripheral chamber 64 at an intermediate height above the manifold pipe, but below the operating level of water to further disburse exhaust gasses passing through the irrigation water within the tank.

Typically, all water injected into the irrigation tank is injected through an inlet nozzle 78. The inlet nozzle 78 is situated in the vertical intake pipe at a location spaced below the heat exchanger 34 but spaced above the manifold pipe. The water sprayed into the exhaust is carried with the exhaust flow to the bottom of the vertical inlet pipe which in turn communicates throughout the manifold pipe to be distributed about the perimeter of the tank within the peripheral chamber 64. Water is supplied to the inlet nozzle 78 through an outlet line 77 which draws water from the settling chamber portion of the solubilizing tank in a closed loop using a circulating pump 79. The outlet line 77 may also pass through the cooling device 47 for cooling prior to injection back into the inlet pipe 30.

Two fluid flow ports 80 are formed in the partition wall 62 between the central settling chamber 60 and the peripheral injection chamber 64 which is located at the second end 68 of the tank farthest from the vertical inlet pipe. The flow ports are located in proximity to the bottom end of the tank below the operating level of fluid within the tank such that the fluid level in the central chamber 60 is substantially maintained at the same level as the peripheral chamber.

Additional gas flow ports communicate through the partition wall 62 near the top of the peripheral injection chamber to balance gas pressure between the central settling chamber 60 and the peripheral injection chamber 64.

To assist in controlling water level within the solubilizing tank substantially at the operating level, a water supply tank 81 may be provided. In this instance, a supply valve 82 is mounted in series with a supply line from the supply tank 81 to the solubilizing tank. More particularly a float 84 is provided within the settling chamber 60 where the water is much less turbulent than in the peripheral chamber 64. The float is connected to the supply valve such that the supply valve is only opened when the fluid level in the central chamber falls below an upper limit of the operating level as prescribed by the float control 84.

In some instances, the outline line 77 which feeds the nozzle 78 may draw water from the water supply tank 81 which in turn draws water from the settling chamber of the tank. An outlet valve 88 can be provided in communication with the water within the central settling chamber of the solubilizing tank 24 which communicates with the outlet line to return water back to the supply tank 81. A level control float 90 is operatively connected to the outlet valve 88 such that the outlet valve may only be opened to allow removal of the water to the tank when the float control 90 determines that the fluid level within the tank is above a prescribed lower limit of the operating level. In this manner, the fluid is always maintained between upper and lower limits as prescribed by the float controls 84 and 90.

Figure 3:
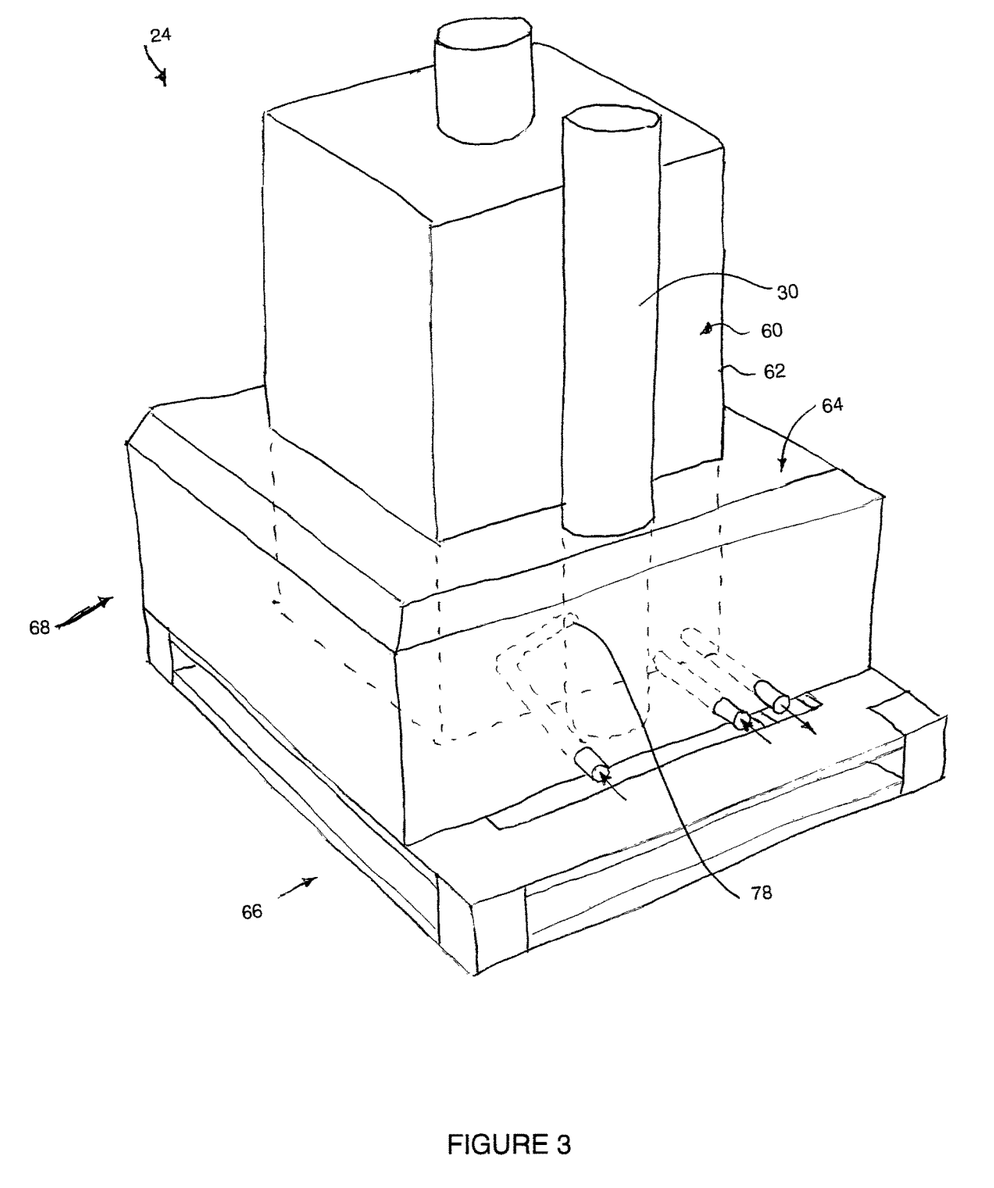
Figure 4:
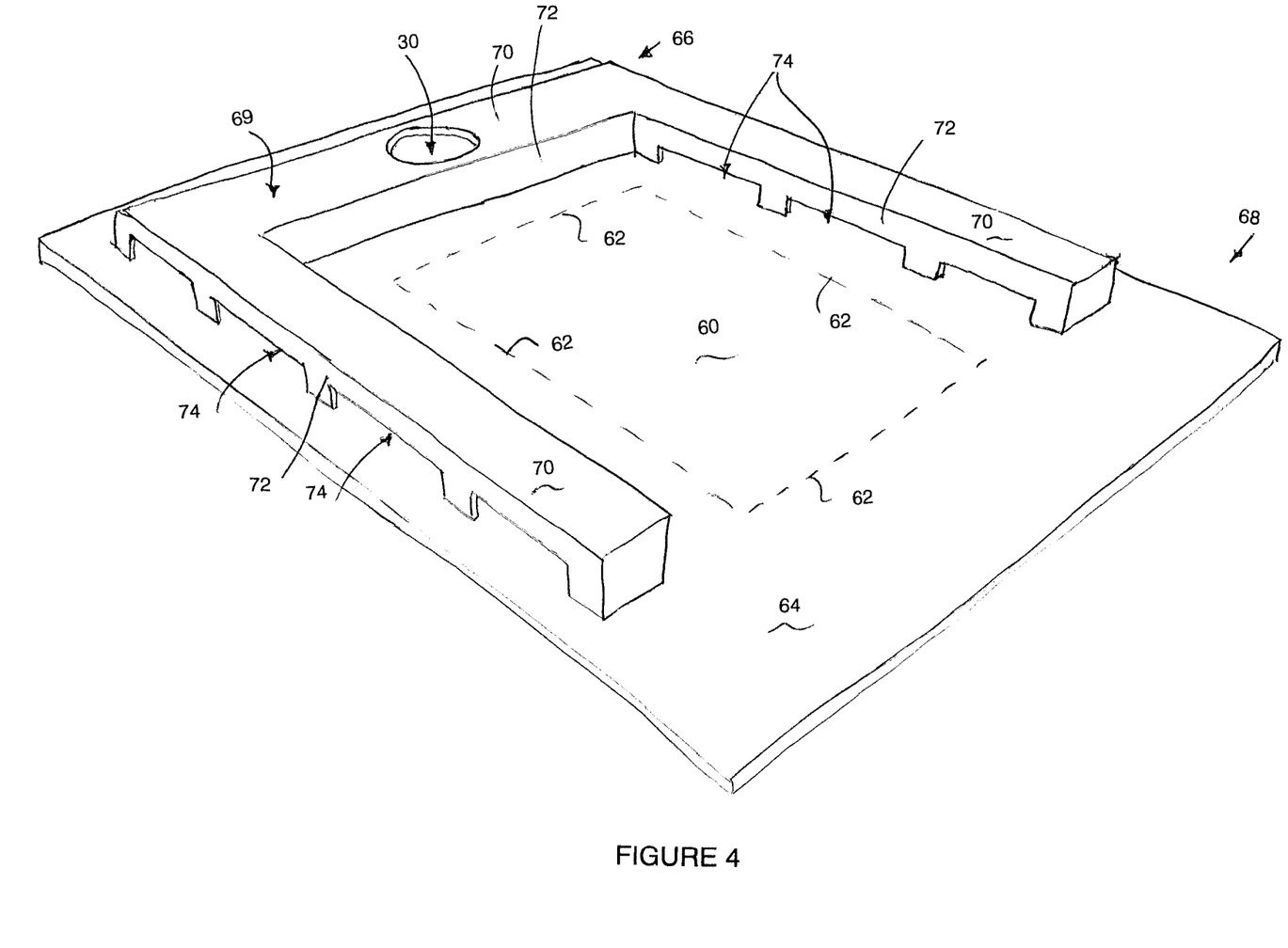
Figure 5:
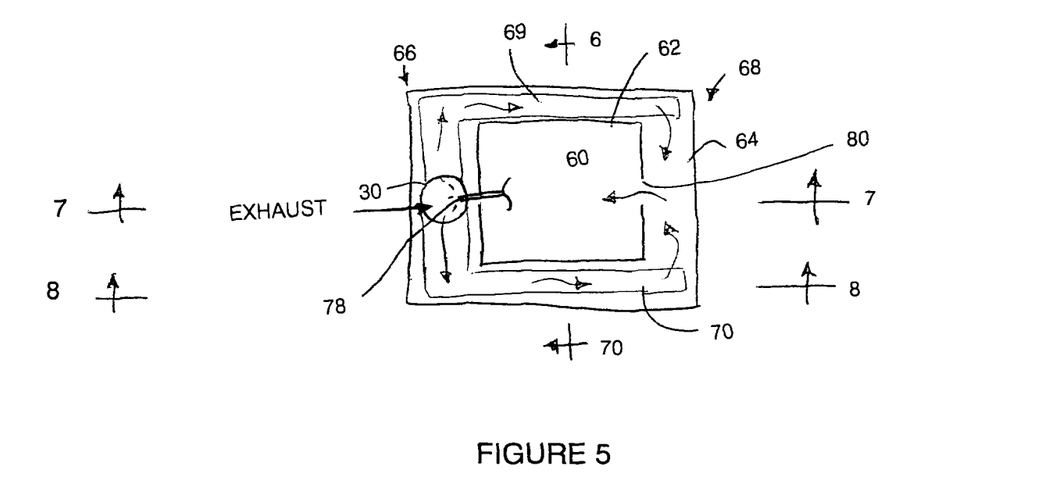
Figure 6:
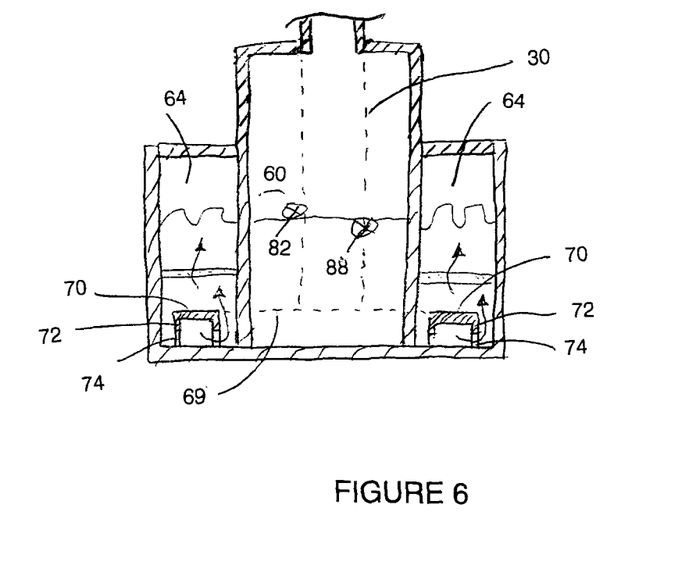
Figure 7:
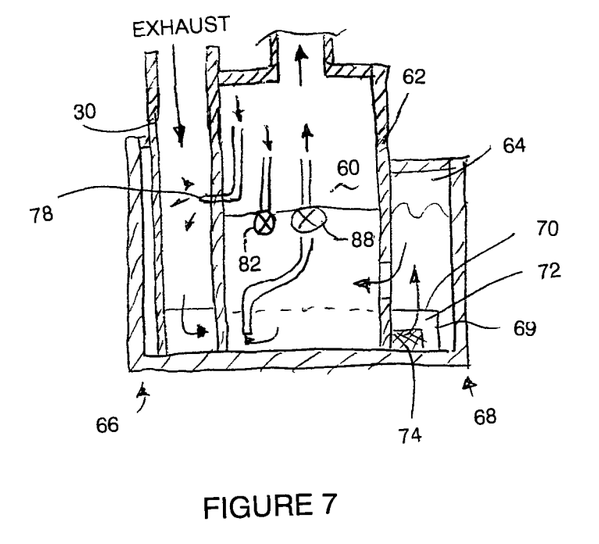
Figure 8:
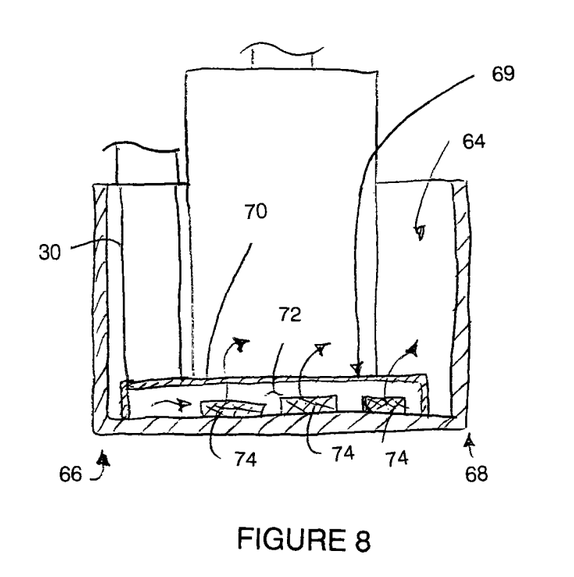

The tank 24 is supported on a pallet base for ease of portability as shown in FIG. 3.

Top ends of the settling chamber and the peripheral injection chamber of the solubilizing tank 24 are sealed and enclosed by a respective top wall portions 92 for capturing the exhaust emissions at subsequent to the omissions being injected into the operating level of water their below. A gas outlet 94 communicates through the top end of the settling chamber 60 at a height which is spaced well above the height of the peripheral injection chamber 64 which locates the operating level of water therein. Accordingly there is considerable opportunity for condensed water carried by the gas flow to settle out back into the settling chamber rather than be carried out the gas outlet with the existing gas flow. To further encourage condensed water droplets to remain within the settling chamber 60, a baffle hood 96 may be provided within the chamber 60 at the inner side of the gas outlet 94 in which a plurality of baffles are provided in an overlapping arrangement relative to one another such that the gas flow must navigate a sinuous path through the baffles to exit the solubilizing tank.

In instances where the solubilizing tank is operated under pressure above atmospheric pressure, a pressure relief valve 97 communicates through the top wall portion of the settling chamber of the solubilizing tank. The pressure relief valve is arranged to vent excess gas pressure externally of the solubilizing tank when pressure exceeds an upper pressure limit of the valve. The pressure relief valve 97 may comprise a two-way valve which is also capable of letting air into the settling chamber of the solubilizing tank if the gas pressure within the tank drops considerably below a lower pressure limit, for example below atmospheric pressure.

A supply duct communicating to various types of delivery equipment from the gas outlet 94 may further be provided with a water trap 98 in some instances to provide an additional means of removing condensed water from the gas flow. The system is operated such that the gas flow exiting the solubilizing or is substantially fully saturated so as to be at or near 100% humidity. The water vapour carried by the gas flow is able to also carry solubilized carbon nanotubes with the gas flow.

Typical operation involves filling the solubilizing tank to the operating level with water followed by operation of the engine in paralysis in which carbon nanotubes seating material has been added to the fuel of the engine to produce carbon nano so it in the exhaust emissions. The exhaust emissions also include nitric acid, carbonic acid, and other chemical components which go into solution in the water within the solubilizing tank. As the concentrations of these chemical components within the water and the solubilizing tank increases, the solubilizing tank becomes effective at solubilizing the carbon nano so that as carbon nanotubes which can then be carried with the water vapour exiting the tank 24 together with the exiting gas flow through the gas outlet 94 to various auxiliary equipment. The exiting gas flow may be directed to equipment which directly applies the gas flow to a crop covered ground or other plant growing medium for example, or alternatively the gas flow may be directed to a secondary tank of water so that the solubilized carbon nanotubes and other beneficial components in the exiting gas flow can be put into solution and stored in solution for subsequent application to a plant growing medium.

Various examples relating to the application of the system 10 described above will now be described in the following with reference to FIGS. 9 through 13.

Figure 9:
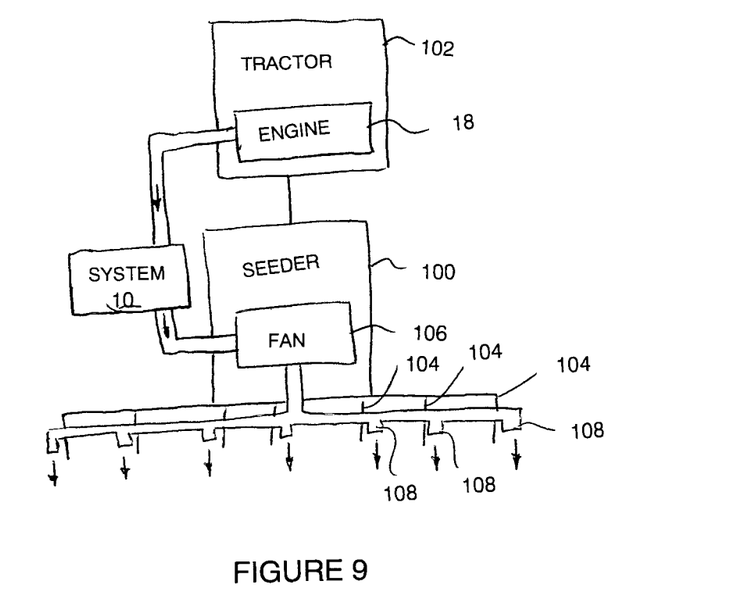

As shown in FIG. 9, the system 10 is shown applied to an agricultural seeding implement 100 having a frame which is towed in a forward working direction by a tractor 102 in which the engine 18 of the system comprises the main driving engine of the tractor. The frame of the seeding implement includes a plurality of furrowing elements 104 which form furrows in the ground in operation. The distribution fan 106 cooperates with a seed metering system for delivering seed carried in a gas flow through a series of seed distribution tubes 108 which deliver the seed to the plurality of furrowing elements respectively. The system 10 in this instance is supported on the frame of either the tractor or the seeding implement for operation between the exhaust emitted from the engine 18 of the tractor and the intake of the distribution fan which is connected by a supply duct to the gas outlet of the solubilizing tank 24. Use of a water trap 98 and/or the baffle arrangement 96 is desired on a seeding implement to remove condensed water vapour which might otherwise plug the seed delivery tubes. When using a distribution fan 106 of the seeding implement, the solubilizing tank 24 is typically not required to operate with any considerable pressure, however a pressure relief 97 remains desirable in case the seed tubes become plugged to prevent excess backflow pressure on the engine.

Figure 10:
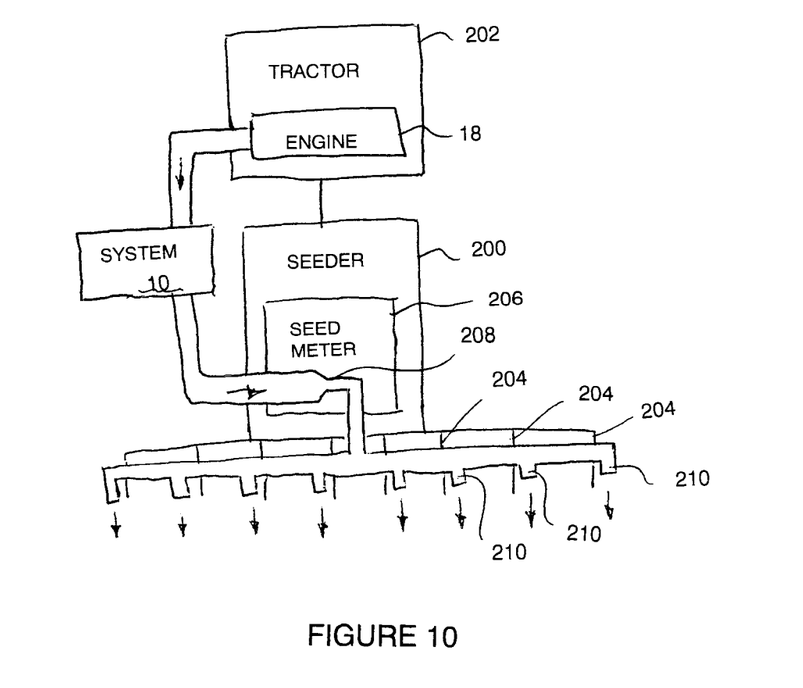

As shown in FIG. 10, the system 10 in this instance is applied to an agricultural seeding implement 200 having a frame which is towed in a forward working direction by a tractor 202 in which the engine 18 of the system comprises the main driving engine of the tractor. The frame of the seeding implement again includes a plurality of furrowing elements 104 which form furrows in the ground in operation. The gas outlet of the solubilizing tank 24 in this instance is fed to a seed metering system 206 which incorporates one or more venturi nozzles 208 therein for accelerating the gas flow from the gas outlet of the system at a location where seed is dispensed controllably into the accelerated gas flow for subsequently carrying the seed into a plurality of seed distribution tubes 210. The distribution tubes deliver the seed carried by the gas flow to the furrowing elements respectively. In this instance the gas pressure exiting the gas outlet of the solubilizing tank 24 provides the sole driving force for the pneumatic flow through the seed distribution tubes carrying the seed to respective ones of the furrowing elements of the seeding implement. In this instance, the solubilizing tank 24 is operated under pressure from the incoming exhaust gas pressure and the gas pressure is contained by sealing the enclosure of the tank 24 between the inlet pipe 30 and the gas outlet 94 thereof. The pressure relief valve 97 is desirable in this instance to ensure any blockage of the distribution tubes does not result in excess pressure within the tank and excess pressure on the exhaust of the engine.

Figure 11:
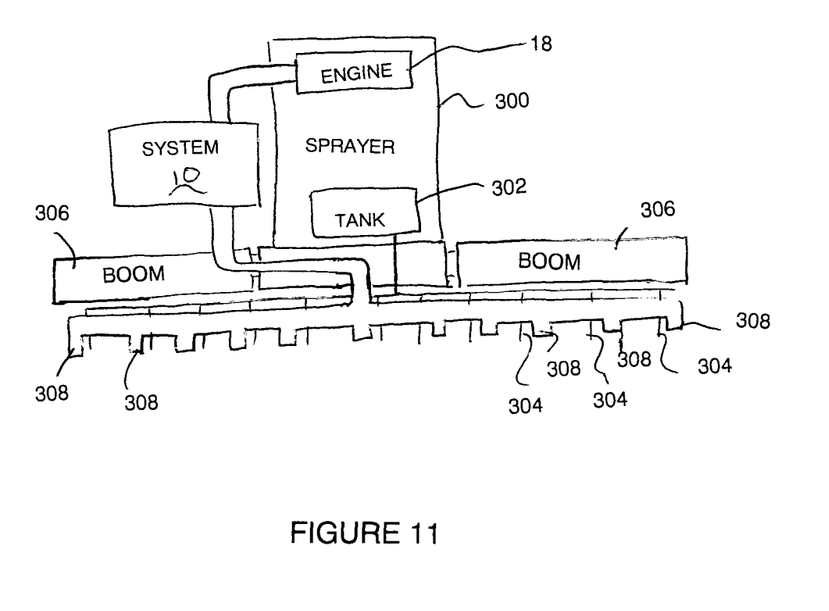

Turning now to FIG. 11, the system 10 in this instance is applied to an agricultural spraying implement 300 in which the engine 18 comprises the main driving engine supported on the frame of the implement 300 for driving the implement forwardly across the ground. The frame of the implement 300 supports a liquid storage tank 302 thereon connected to a manifold which in turn connects to a plurality of liquid nozzles 304 supported at spaced apart positions along respective booms 306 of the implement 300 in the usual manner of a spraying implement. The implement 300 is distinguished by supporting the system 10 on the frame of the implement together with a supply duct connected from the gas outlet of the system 10 to a second manifold supported along the length of the booms 306 for connection to respective dispensing nozzles 308. In this instance, the exhaust pressure from the engine provides the sole driving pressure for distributing the gas flow exiting the gas outlet of the system 10 through the manifold to the respective nozzles 308. A pressure relief valve 97 is accordingly desirable to ensure any blockages or excess pressure does not place undesirable excess pressure at the exhaust of the engine 18. The solubilizing tank 24 in this instance may be distinguished by being lower in profile without in the upper portion of the settling chamber 60 being required for baffles 96 as any condensed water carried by the gas flow to the dispensing system is not harmful. Similarly, a water trap 98 is not required.

Figure 12:
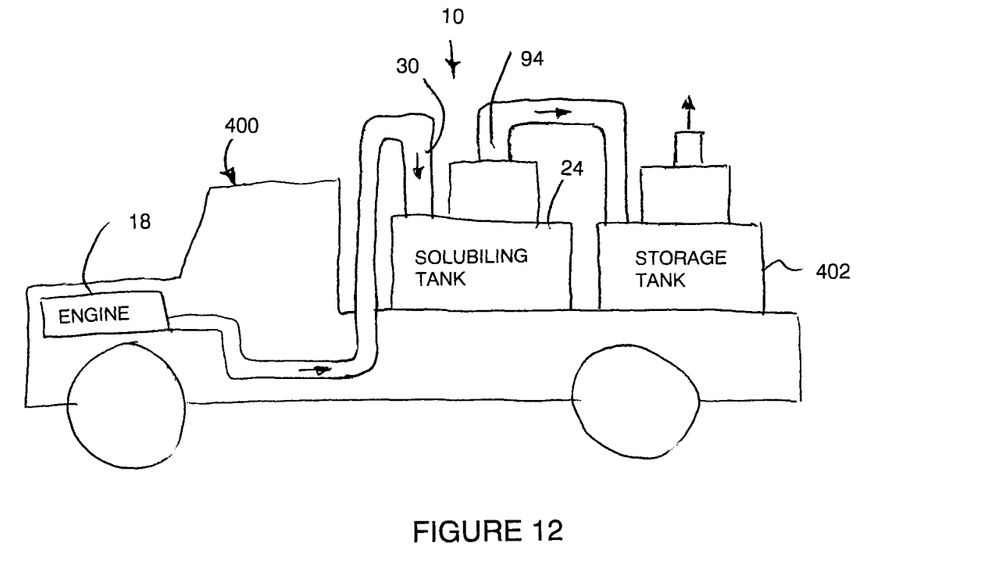

Turning now to FIG. 12, the system in this instance may be applied to a passenger vehicle 400, for example a pickup truck having a truck box which can receive the solubilizing tank 24 therein. The engine 18 of the system in this instance comprises the primary driving engine of the vehicle. The truck box also supports a storage tank 402 therein providing the function of a scrubber tank which is substantially identical in configuration to the solubilizing tank 24 with regard to the configuration of the inlet pipe, the injection array in the peripheral injection chamber, the central settling chamber, and the gas outlet thereof. The storage tank 402 is not required to be operated under pressure and is typically simply vented to atmosphere as any beneficial compounds found in the exhaust stream exiting the gas outlet of the solubilizing tank 24 are intended to be scrubbed in the operating level of water in the storage tank 402 to remain in solution within the storage tank 402. The condensate within the storage tank 402 can then be used subsequently for application to crops or other plant growing mediums for example.

Figure 13:
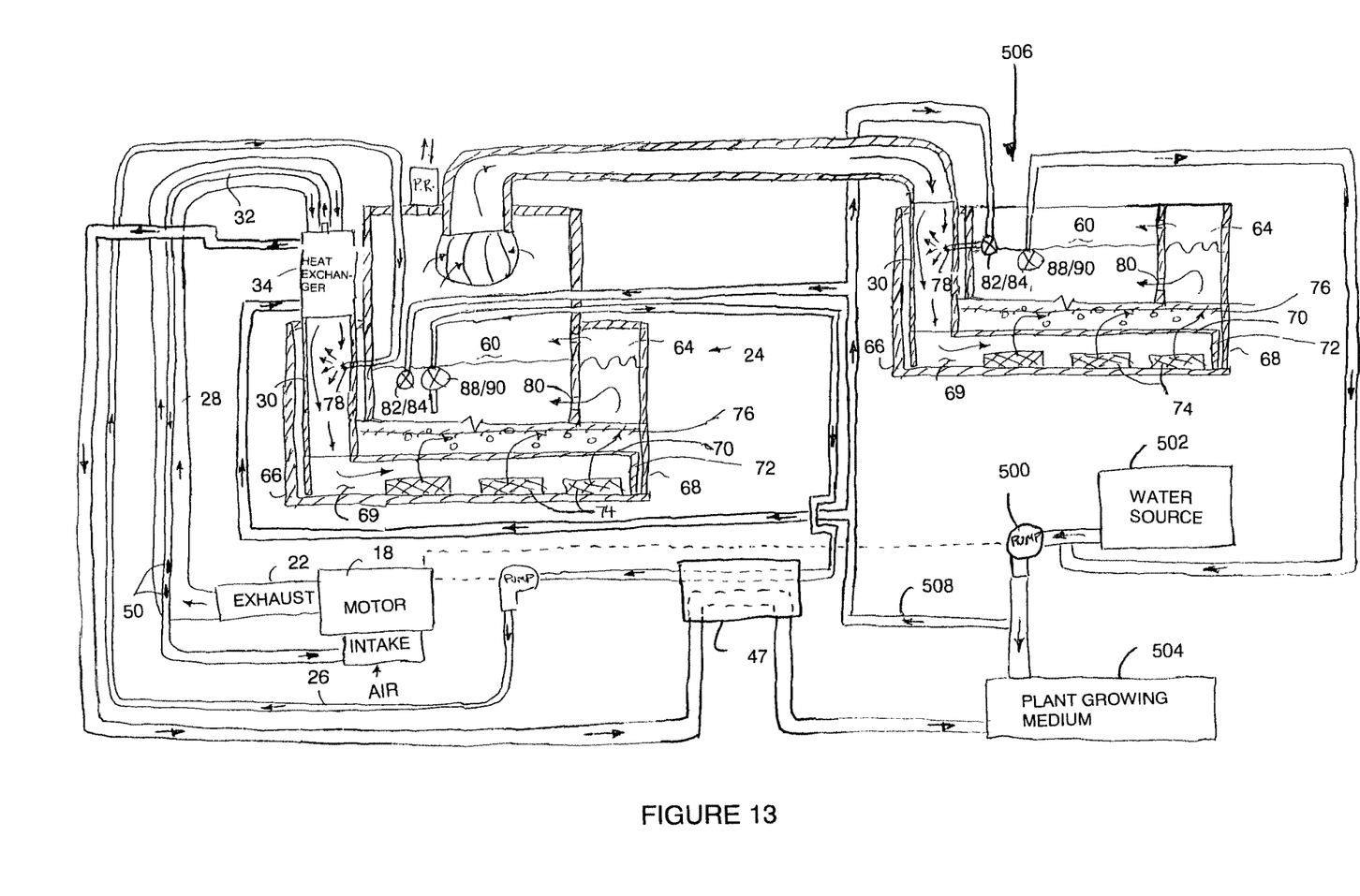

Turning now to FIG. 13, the system 10 in this instance is shown applied to an irrigation system comprising an irrigation pump 500 which is driven by the motor 18 for pumping water from a water source 502 to a plant growing medium 504 to be irrigated. The gas outlet of the solubilizing tank 24 in this instance communicates to the inlet pipe 30 of a scrubber tank 506. The scrubber tank 506 is substantially identical to the solubilizing tank 24 with regard to the inlet pipe 30, the injection array within the peripheral injection chamber 64, the central settling chamber 60, and the injection nozzle 78 for spring water into the inlet pipe 30. Water is added to the tank 506 using a branch line 508 communicating to the outlet side of the irrigation pump 500 to supply freshly pumped irrigation water directly to the nozzle 78. The branch line 508 also provides water to the inlet valve 82 of the solubilizing tank 24 in place of the water supply tank 81 according to FIG. 1. The branch line 508 can also supply water used as the cooling fluid within the heat exchanger 34 of the solubilizing tank 24 with the return flow being subsequently directed to the plant growing medium 504. The outlet valve 88 of the solubilizing tank 24 in this instance returns water in a closed loop directly to the nozzle 78, however the fluid may be cooled at cooling device 47 which uses irrigation water for cooling or other means as may be desired. In the scrubber tank 506 and the inlet valve 82 with a float control 84 allows water to be sprayed into the inlet pipe through the nozzle 78 provided that the water level within the tank stays below an upper limit determined by the float 84. The outlet line of the scrubber tank 506 including the outlet valve 88 controlled by the float 90 thereof communicates from the settling chamber of the scrubber tank 506 to the intake side of the irrigation pump 500 such that the solution within the scrubber tank 506 is continuously drawn by low pressure suction into the intake side of the irrigation pump provided that the level within the tank is above a prescribed lower limit as determined by the float 90. The system according to FIG. 13 functions similar to the embodiment of FIG. 12 in that the solubilizing tank 24 functions as described above with regard to FIG. 1 to solubilize carbon nanotubes to be carried with water vapour exiting the gas outlet, followed by the exiting gas flow being directed into the water within the scrubber tank 506 to substantially remain in solution within the scrubber tank for subsequent application of the solution within the scrubber tank to a plant growing medium. In the instance of FIG. 13, the solution is applied to a crop or other plant growing medium with irrigation water.

Figure 14:
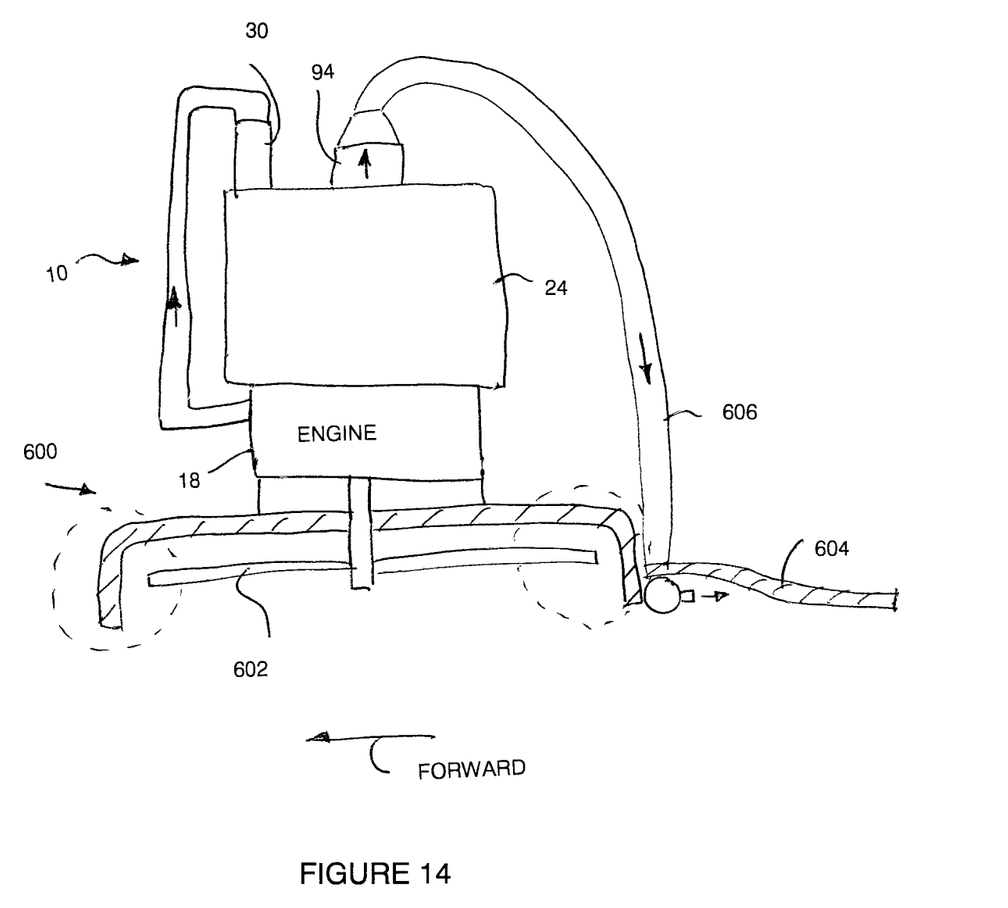

Turning now to FIG. 14, the system 10 in this instance is shown supported on a lawn mower 600. The lawn mower includes a deck frame supported on wheels for rolling movement in a forward working direction. A mower blade is rotatably supported below the mower deck frame for cutting grass. The blade is driven to rotate by the engine 18 of the system which comprises the main mower engine of the lawn mower in this instance. An exhaust trap 604 is provided in the form of a flexible sheet supported to lay flat against the ground, extending rearward from the mower deck frame so as to be in a trailing relationship with the mower deck frame as the mower is operated in the forward working direction. A supply duct 606 communicates from the gas outlet 94 of the solubilizing tank 24 to a plurality of distribution nozzles on a manifold supported between the leading edge of the exhaust trap so as to direct the gas flow exiting the solubilizing tank onto the ground beneath the exhaust trap 604.

Since various modifications can be made in my invention as herein above described, it is intended that all matter contained in the accompanying specification shall be interpreted as illustrative only and not in a limiting sense.

The invention claimed is:

1. An exhaust recycling system comprising:

an internal combustion engine including engine controls for operating the engine so as to produce exhaust emissions containing carbon nano soot therein;

a solubilizing tank containing an operating level of water including nitric acid in solution in the water;

an exhaust duct for connection between the engine and the solubilizing tank for communicating the exhaust emissions containing carbon nano soot from the engine to the solubilizing tank;

an injection array supported in the tank below the operating level of the water, the injection array being in communication with the exhaust duct so as to be arranged to inject the exhaust emissions into the water within the solubilizing tank so as to solubilize the carbon nano soot as carbon nano tubes within the water in the solubilizing tank; and a gas outlet on the solubilizing tank for receiving a gas flow exiting the tank such that some water and some solubilized carbon nano tubes are carried with the gas flow for subsequent delivery to a plant growing medium.

2. The system according to claim 1 wherein the engine controls are arranged to operate the engine in pyrolysis to produce the carbon nano soot, and wherein the water in the solubilizing tank contains the nitric acid at saturation level therein, carbonic acid at saturation level therein, fulvic acid therein, and aromatic compounds therein.

3. The system according to claim 1 further comprising a heat exchanger in series with the exhaust duct for cooling the exhaust emissions prior to injecting the exhaust emissions into the solubilizing tank.

4. The system according to claim 3 including a controller for operating the heat exchanger to vary a rate of cooling responsive to a sensed temperature of the exhaust emissions.

5. The system according to claim 1 further comprising a cooling circuit communicating in a closed loop between the solubilizing tank and a cooling device for cooling the water in the solubilizing tank.

6. The system according to claim 5 including a controller for operating the cooling circuit to vary a rate of cooling responsive to a sensed temperature of the water.

7. The system according to claim 1 further comprising an exhaust inlet pipe on the solubilizing tank for communicating exhaust emissions from the exhaust duct into the solubilizing tank and a spray nozzle in the exhaust inlet pipe which communicates with the solubilizing tank for spraying water from the solubilizing tank into a flow of exhaust emissions entering the solubilizing tank through the exhaust inlet pipe.

8. The system according to claim 1 further comprising a branch duct communicating between the exhaust duct and a combustion air intake of the engine such that a primary flow of the exhaust emissions is directed by the exhaust duct into the solubilizing tank and a secondary flow of the exhaust emissions is directed by the branch duct into the combustion air intake.

9. The system according to claim 1 further comprising an auxiliary water tank and a water control system arranged to transfer water between the auxiliary water tank and the solubilizing tank to maintain the water in the solubilizing tank at the operating level.

10. The system according to claim 1 wherein the injection array comprises a manifold structure supported in the solubilizing tank below the operating water level, the manifold structure having a horizontally extending upper duct portion for communicating exhaust emissions therethrough along a bottom end of the solubilizing tank and a plurality of injection openings at horizontally spaced apart positions along the manifold structure below the upper duct portion for dispersing exhaust emissions into the solubilizing tank.

11. The system according to claim 1 further comprising a partition member separating the tank into an injection portion receiving the injection array therein and a settling portion separate from the injection portion which communicates with the gas outlet, the partition member including at least one opening therein for communicating water and exhaust emissions from the injection portion to the settling portion.

12. The system according to claim 1 further comprising an agricultural seeding implement having a distribution fan for pneumatically conveying seed through seed tubes for delivery into furrows in a ground surface, the distribution fan having an inlet in communication with the gas outlet on the solubilizing tank for directing said gas flow into the seed tubes.

13. The system according to claim 12 further comprising a water separator in series with the gas outlet for removing liquid water from said gas flow prior to delivery to the distribution fan.

14. The system according to claim 1 wherein the engine comprises a primary engine of a tractor and wherein the system further comprises an agricultural seeding implement towed by the tractor, the agricultural implement comprising:

a plurality of furrowing elements for forming furrows in the ground;

a plurality of seed distribution tubes for delivering seed to the furrowing elements respectively;

a seed metering system for metering seed into the seed distribution tubes respectively; and a supply duct communicating between the gas outlet on the solubilizing tank and the seed distribution tubes such that a gas pressure for conveying seed through the seed distribution tubes to the furrowing elements is derived solely from exhaust pressure from the internal combustion engine which is communicated through the solubilizing tank.

15. The system according to claim 1 further comprising an agricultural spraying implement for being driven across a crop covered ground by said internal combustion engine, the agricultural spraying implement including a boom supporting a plurality of spaced apart dispensing nozzles thereon and a supply duct communicating between the gas outlet of the solubilizing tank and the dispensing nozzles for dispensing said gas flow carrying the water and the solubilized carbon nano tubes onto said crop covered ground through the dispensing nozzles.

16. The system according to claim 1 wherein the engine comprises a primary engine of a passenger vehicle, the system further comprising an auxiliary tank containing an operating level of water therein and an auxiliary injection array supported in the auxiliary tank below the operating level of the auxiliary tank, the auxiliary injection array being in communication with the gas outlet of the solubilizing tank so as to be arranged to disperse the gas flow from the gas outlet into the water with the auxiliary tank.

17. The system according to claim 1 wherein the engine comprises a pump engine of an irrigation pump in an irrigation system, the gas outlet of the solubilizing tank communicating with irrigation water of the irrigation system for delivery to the plant growing medium together with the irrigation water.

18. The system according to claim 1 wherein the engine comprises a mower engine for driving rotation of a mower blade on a lawn mower, the system further comprising an exhaust trap for being supported in trailing relationship along the ground relative to the mower and a supply duct communicating between the gas outlet of the solubilizer tank and the exhaust trap for dispensing exhaust beneath the exhaust trap.

* * * * *